United States Patent
Pfeiffer et al.

(10) Patent No.: US 7,904,228 B2
(45) Date of Patent: Mar. 8, 2011

(54) DISTANCE RELATED CRUISE CONTROL SYSTEM AND METHOD

(75) Inventors: Andreas Pfeiffer, Holzkirchen (DE); Joachim Steinle, Munich (DE); Martin Brandstaeter, Greenville, SC (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 69 days.

(21) Appl. No.: 12/048,314

(22) Filed: Mar. 14, 2008

(65) Prior Publication Data

US 2008/0162011 A1 Jul. 3, 2008

Related U.S. Application Data

(63) Continuation of application No. PCT/EP2006/008125, filed on Aug. 17, 2006.

(30) Foreign Application Priority Data

Sep. 16, 2005 (DE) .......................... 10 2005 044 174

(51) Int. Cl.
*B60K 31/00* (2006.01)
(52) U.S. Cl. .............. 701/96; 701/97; 180/169; 180/170
(58) Field of Classification Search .................... 701/96, 701/97; 180/167–179
See application file for complete search history.

(56) References Cited

U.S. PATENT DOCUMENTS

| 3,952,301 | A | * | 4/1976 | Sorkin | 342/71 |
| 5,234,071 | A | * | 8/1993 | Kajiwara | 180/169 |
| 5,400,864 | A | | 3/1995 | Winner et al. | |
| 5,689,422 | A | * | 11/1997 | Heymann et al. | 701/93 |
| 5,839,534 | A | * | 11/1998 | Chakraborty et al. | 180/169 |
| 5,871,062 | A | | 2/1999 | Desens et al. | |
| 5,977,869 | A | | 11/1999 | Andreas | |
| 6,161,074 | A | * | 12/2000 | Sielagoski et al. | 701/96 |
| 6,259,985 | B1 | * | 7/2001 | Sielagoski et al. | 701/96 |
| 7,032,699 | B2 | * | 4/2006 | Sakata et al. | 180/247 |
| 7,099,766 | B2 | * | 8/2006 | Michi et al. | 701/96 |
| 7,701,156 | B2 | * | 4/2010 | Okamura | 318/255 |
| 2002/0138190 | A1 | * | 9/2002 | Hellmann et al. | 701/78 |
| 2002/0177935 | A1 | * | 11/2002 | Winner et al. | 701/93 |
| 2004/0040759 | A1 | * | 3/2004 | Shimizu et al. | 180/65.2 |

(Continued)

FOREIGN PATENT DOCUMENTS

DE 42 00 694 B4 7/1993

(Continued)

OTHER PUBLICATIONS

German Search Report dated Jun. 6, 2006 w/English translation of pertinent portions (nine (9) pages).

(Continued)

*Primary Examiner* — Mark Hellner
*Assistant Examiner* — Ari M Diacou
(74) *Attorney, Agent, or Firm* — Crowell & Moring LLP

(57) ABSTRACT

A distance-related cruise control system and method for a motor vehicle performs a speed control to a predefined desired speed during free travel of the motor vehicle and performs a distance regulation to a predefined distance to the vehicle traveling ahead during following travel. After deactivation of the distance regulation during following travel, the system performs a speed control, not to the previously defined speed, but rather to the current speed of the motor vehicle at the instant of the deactivation of the distance regulation as the desired speed.

9 Claims, 1 Drawing Sheet

U.S. PATENT DOCUMENTS

| | | | |
|---|---|---|---|
| 2004/0163860 A1* | 8/2004 | Matsuzaki et al. | 180/65.2 |
| 2004/0212483 A1 | 10/2004 | Braeuchle et al. | |
| 2005/0143894 A1* | 6/2005 | Wagner et al. | 701/93 |
| 2005/0251313 A1 | 11/2005 | Heinrichs-Bartscher | |
| 2006/0201730 A1* | 9/2006 | Kaneko et al. | 180/243 |
| 2007/0265760 A1* | 11/2007 | Konhauser et al. | 701/97 |
| 2009/0037071 A1* | 2/2009 | Inoue | 701/96 |
| 2009/0055069 A1* | 2/2009 | Lindqvist et al. | 701/96 |
| 2009/0159348 A1* | 6/2009 | Oyobe et al. | 180/65.21 |

FOREIGN PATENT DOCUMENTS

| | | |
|---|---|---|
| DE | 195 14 023 A1 | 10/1996 |
| DE | 196 50 168 C2 | 6/1998 |
| DE | 101 31 478 A1 | 1/2003 |
| DE | 102 12 684 A1 | 10/2003 |
| DE | 103 16 313 A1 | 10/2004 |
| EP | 0 876 936 B1 | 11/1998 |
| EP | 1 288 055 A2 | 3/2003 |
| WO | WO 2004007231 A1 * | 1/2004 |
| WO | WO 2004/045891 A1 | 6/2004 |

OTHER PUBLICATIONS

International Search Report dated Dec. 27, 2006 w/English translation (four (4) pages).

* cited by examiner

DISTANCE RELATED CRUISE CONTROL SYSTEM AND METHOD

CROSS-REFERENCE TO RELATED APPLICATIONS

This application is a continuation of PCT International Application No. PCT/EP2006/008125, filed on Aug. 17, 2006, which claims priority under 35 U.S.C. §119 to German Application No. 10 2005 044 174.2, filed Sep. 16, 2005, the entire disclosures of which are expressly incorporated by reference herein.

BACKGROUND AND SUMMARY OF THE INVENTION

The invention relates to a distance-related cruise control system for a motor vehicle, which performs a speed control to a predefined desired speed during free travel of the motor vehicle and performs a distance regulation to a predefined distance to the vehicle traveling ahead during travel following a vehicle traveling ahead, wherein the distance regulation function is deactivatable.

Distance-related cruise control systems in motor vehicles are used for the purpose of predefining corrective signals for controlling the speed of the vehicle to be at a speed predefined by the driver, if no vehicle driving ahead, i.e., no target object, is detected on the same lane by the sensors for monitoring the space in front of the vehicle. This is thus considered "free travel" of the motor vehicle. However, if a vehicle traveling ahead is detected on the lane, and if this vehicle traveling ahead is determined as the target object, then actuating signals are predefined for controlling the speed such that a predefined distance to the vehicle or target object detected on the lane is maintained. This is considered to be "distance regulation" to a target object.

A distance-related cruise control system, in which the regulation of the distance is interrupted for a predetermined time in the event of an intervention by the driver in the driving activities (such as in the form of setting the turn signal indicator and/or actuating the gas pedal), is known from DE 42 00 694 B4. In DE '694, it is ensured by the interruption of the distance regulation that after engagement of the driver, the current distance to an object located in the driving direction, in particular to a vehicle traveling ahead, is no longer taken into consideration by the control unit.

Furthermore, a method for speed control and distance regulation of a motor vehicle is known from EP 0 876 936 B1, in which distance regulation is interrupted in the event of an engagement of the driver in the driving activities. The motor vehicle is then controlled to the predefined desired speed in the scope of the speed control. This method of EP '936 is designed to support the driver during a passing procedure, inter alia, in such a manner that he may drive closer to the vehicle traveling ahead shortly before the passing procedure, in order to subsequently be able to pass the vehicle traveling ahead rapidly.

Furthermore, a driver assistance system is known from DE 102 12 684 A1, which may perform at least one speed control with and without distance regulation. The various regulating strategies of DE '684 are selectable by the driver using an operating element.

The object of the invention is to specify an improved distance-related cruise control system.

This object is achieved according to the invention by a distance-related cruise control system for a motor vehicle, which performs a speed control to a predefined desired speed during free travel of the motor vehicle and performs a distance regulation to a predefined distance to the vehicle traveling ahead during travel following a vehicle traveling ahead, wherein the distance regulation function is deactivatable. The distance-related cruise control system, after the deactivation of the distance regulation during following travel, performs a speed control to the current speed of the motor vehicle as the desired speed. Advantageous refinements are described and claimed herein.

Other objects, advantages and novel features of the present invention will become apparent from the following detailed description when considered in conjunction with the accompanying drawing.

DETAILED DESCRIPTION OF THE DRAWING

Figure 1:
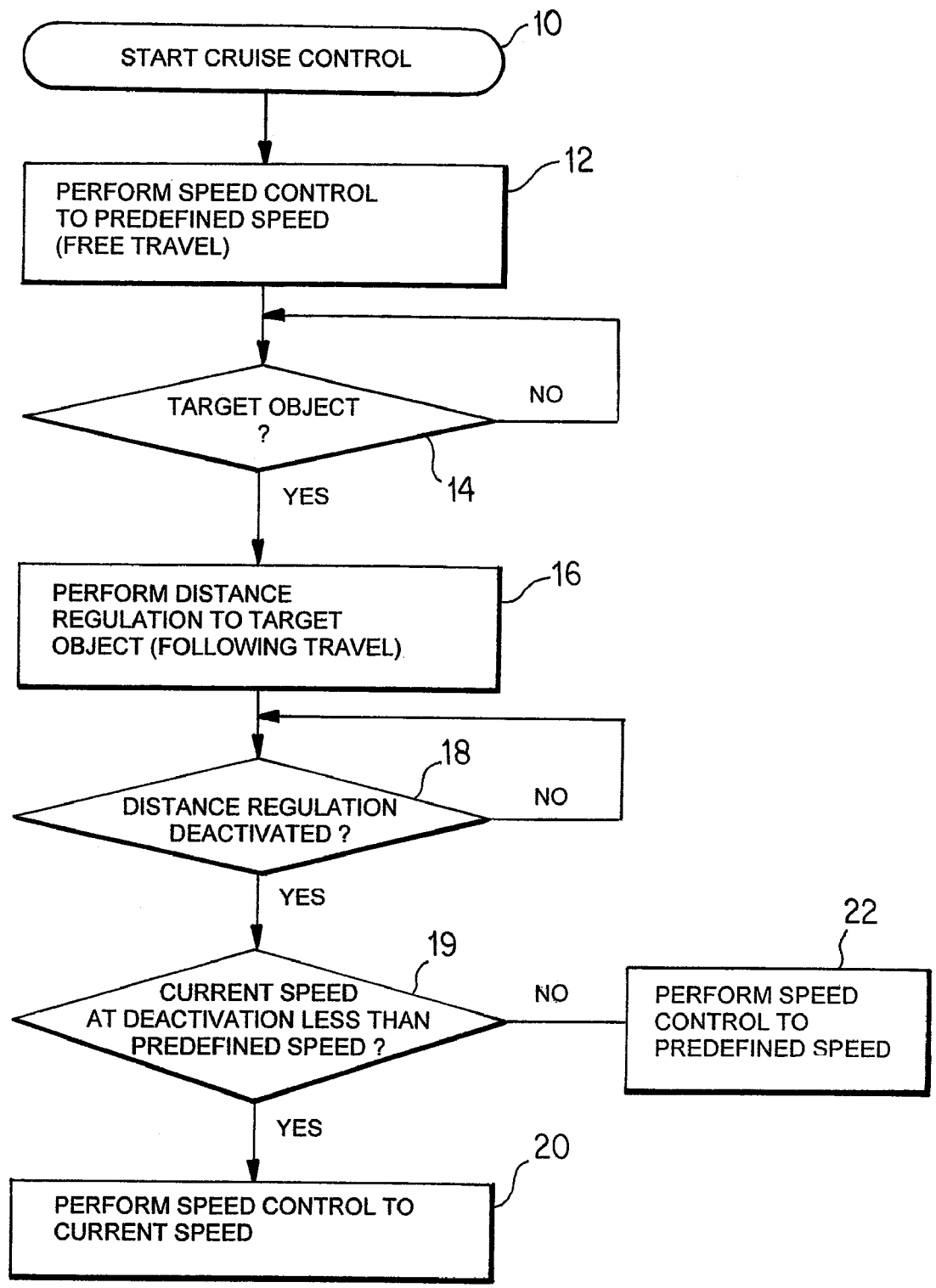
FIG. 1 is a flow chart illustrating the method of operating a distance-related cruise control system according to the present invention.

The distance-related cruise control system for a motor vehicle, which performs a speed control to a predefined desired speed during free travel of the motor vehicle and performs a distance regulation to a predefined distance to the vehicle traveling ahead during following travel, and in which the distance regulation is deactivatable, is distinguished in that the distance-related cruise control system, after the deactivation of the distance regulation during following travel, does not perform the speed control to the previously defined speed as the desired speed, but rather to the current speed of the motor vehicle at the time of the deactivation of the distance regulation.

In principle, typical or customary control is performed while the distance-related cruise control system is active. This means that during free travel, i.e., when no target object is detected, the distance-related cruise control system solely performs speed control to a desired speed predefined by the driver. However, if a vehicle traveling ahead is recognized as being in the vehicle's own lane and thus becomes a target object, then if the target object has a lower speed than the predefined desired speed, a distance regulation to a predefined distance to the target object is performed. The distance may be predefined by the driver or by analyzing various operating parameters and/or sensor signals of the motor vehicle.

Furthermore, the distance-related cruise control system according to the invention provides that the distance regulation is deactivatable. If the distance regulation is manually or automatically deactivated during following travel, i.e., during the distance regulation, then according to the invention, the speed is not controlled at the previously predefined desired speed. Rather, the current speed of the motor vehicle, i.e., the speed at which the motor vehicle moves at the instant of the deactivation of the distance regulation, is predefined as the desired speed. The speed is then controlled at this current speed control. This is to prevent the motor vehicle equipped with the distance-related cruise control system from running into the target object if the vehicle traveling ahead or the target object travels further at the same speed. This is advantageous above all if the driver does not feel safe during following travel on a curvy road section because of the high speed of the vehicle traveling ahead and therefore deactivates the distance regulation.

The distance-related cruise control system advantageously only performs the speed control to the current speed as the desired speed when the current speed is less than the predefined desired speed. This is advisable when the driver briefly overrides the control by actuating the gas pedal in such a manner that the motor vehicle travels at a speed increased from the desired speed, for example. In this case, upon deactivation of the distance regulation, the speed is not controlled to the current speed, but rather the previously defined desired speed. It is unimportant in this case whether the deactivation has occurred during following or free travel.

The distance regulation is advantageously manually deactivatable by the driver and/or automatically deactivatable in the event a predefined condition exists. Manual deactivation by the driver is possible by actuating an operating element, for example. Automatic deactivation may occur, for example, if an operating state of the vehicle, a traffic environment, and/or a weather environment is recognized on the basis of an analysis of predefined operating parameters and/or predefined sensor signals, which makes automatic deactivation of the distance regulation appear advisable.

The distance-related cruise control system advantageously generates a notification signal in the event of deactivated distance regulation to make the driver aware that the distance regulation is currently inactive. The notification signal may be implemented acoustically, visually, haptically and/or kinesthetically.

The deactivated distance regulation is advantageously reactivated after a predefined time interval and/or upon the existence of a second condition. The unrestricted function of the distance-related cruise control system is thus again available to the driver.

An exemplary method is illustrated in FIG. 1. Upon start of the cruise control system (10), speed control is typically performed to a predefined speed during free travel (12). In the event that a target object is detected (14), the cruise control system can perform distance-regulation to the target object during following travel (16). Upon deactivation of the distance regulation (18), either manually by the driver or automatically, the method performs the speed control to the current speed at the time of deactivation (20).

Advantageously, upon deactivation of the distance-regulation (18), it is determined whether the current speed is less than the predefined desired speed (19). If the current speed is less than the predefined desired speed, then the method performs the speed control to the current speed (20). If, however, the current speed at deactivation is greater than the predefined desired speed, then the method may perform speed control to the predefined desired speed (22).

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a distance-related cruise control system for a motor vehicle, the method comprising the acts of:

performing speed control to a predefined desired speed during free travel of the motor vehicle;

performing distance regulation to a predefined distance to a vehicle traveling ahead of the vehicle during following travel; and determining, in the event that the distance regulation has been deactivated, whether a current speed of the motor vehicle is less than the predefined desired speed during free travel; and after deactivation of the distance-regulation during following travel, performing speed control to the current speed of the motor vehicle as a desired speed only when the current speed is less than the predefined desired speed during free travel.

2. The method according to claim 1, further comprising the act of deactivating the distance regulation during following travel either manually by a driver of the vehicle or automatically upon determining a predefined condition.

3. The method according to claim 1, further comprising the act of generating a notification signal when the distance regulation is deactivated.

4. The method according to claim 2, further comprising the act of generating a notification signal when the distance regulation is deactivated.

5. The method according to claim 1, further comprising the act of reactivating the distance regulation that has been deactivated after at least one of a predefined time interval and a determination of a second condition.

6. A distance-related cruise control system for a motor vehicle, the system comprising:

a free travel speed control unit for controlling a speed of the motor vehicle to a predefined desired speed; and a following travel distance regulation unit for regulating a distance to a vehicle traveling ahead of the motor vehicle to a predefined distance, the distance regulation unit being deactivatable;

wherein the speed control unit is to determine, in the event that the distance regulation unit has been deactivated, whether a current speed of the motor vehicle is less than the predefined desired speed during free travel, and wherein, after deactivation of the distance-regulation unit, the speed control unit controls a speed of the motor vehicle to the current speed of the motor vehicle as a desired speed only when the current speed is less than the predefined desired speed during free travel.

7. The distance-related cruise control system according to claim 6, wherein the distance regulation unit is deactivatable manually by a driver or automatically upon determining a predefined condition exists.

8. The distance-related cruise control system according to claim 6, further comprising an indicator that provides a notification signal when the distance regulation unit is deactivated.

9. The distance-related cruise control system according to claim 6, wherein the distance regulation unit is reactivated after a predefined time interval or upon determining a second condition exists, following a deactivation of the distance regulation unit.

* * * * *